(12) United States Patent
Zhang et al.

(10) Patent No.: US 7,539,616 B2
(45) Date of Patent: May 26, 2009

(54) SPEAKER AUTHENTICATION USING ADAPTED BACKGROUND MODELS

(75) Inventors: Zhengyou Zhang, Bellevue, WA (US); Ming Liu, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 502 days.

(21) Appl. No.: 11/358,302

(22) Filed: Feb. 20, 2006

(65) Prior Publication Data

US 2007/0198257 A1    Aug. 23, 2007

(51) Int. Cl.
    *G10L 15/00* (2006.01)
(52) U.S. Cl. ............... 704/233; 704/239; 704/255; 704/256
(58) Field of Classification Search ........... 704/233, 704/239, 255–256
    See application file for complete search history.

(56) References Cited

U.S. PATENT DOCUMENTS

| | | | | |
|---|---|---|---|---|
| 5,625,748 A | * | 4/1997 | McDonough et al. | ....... 704/251 |
| 5,787,394 A | * | 7/1998 | Bahl et al. | ........... 704/238 |
| 5,864,810 A | * | 1/1999 | Digalakis et al. | ........ 704/255 |
| 6,055,498 A | * | 4/2000 | Neumeyer et al. | ........ 704/246 |
| 6,161,090 A | | 12/2000 | Kanevsky et al. | ........ 704/246 |
| 6,226,611 B1 | * | 5/2001 | Neumeyer et al. | ........ 704/246 |
| 6,336,108 B1 | * | 1/2002 | Thiesson et al. | ......... 706/20 |
| 6,697,778 B1 | * | 2/2004 | Kuhn et al. | .............. 704/243 |

FOREIGN PATENT DOCUMENTS

KR    10-2005-28379    3/2005

OTHER PUBLICATIONS

An Official Search Report and Written Opinion of the Korean Patent Office in counterpart foreign application No. PCT/US2007/004137 filed Jul. 23, 2007.

Rong Zheng et al., "Text-Independent Speaker Identification Using GMM-UBM and Frame Level Likelihood Normalization," ISCSLP 2004, IEEE 2004, pp. 289-292.

C. Martin del Alamo et al., "Incremental Speaker Adaptation with Minimum Error Discriminative Training for Speaker Identification," Proc. of ICSLP 96, IEEE, 1996, vol. 3, pp. 1760-1763.

S. Furui, "Cepstral Analysis Technique for Automatic Speaker Verification," IEEE trans. on ASSP vol. 29, No. 2, Apr. 1981.

G.R. Doddington, "Speaker-Identifying People by Their Voices," Proceedings of IEEE, vol. 73, No. 11, pp. 1651-1644, 1986.

(Continued)

*Primary Examiner*—Michael N Opsasnick
(74) *Attorney, Agent, or Firm*—Theodore M. Magee; Westman, Champlin & Kelly, P.A.

(57) ABSTRACT

Speaker authentication is performed by determining a similarity score for a test utterance and a stored training utterance. Computing the similarity score involves determining the sum of a group of functions, where each function includes the product of a posterior probability of a mixture component and a difference between an adapted mean and a background mean. The adapted mean is formed based on the background mean and the test utterance. The speech content provided by the speaker for authentication can be text-independent (i.e., any content they want to say) or text-dependent (i.e., a particular phrase used for training).

12 Claims, 13 Drawing Sheets

OTHER PUBLICATIONS

K. Yu, J. Mason, J. Oglesby, "Speaker Recognition Using Hidden Markov Models, Dynamic Time Warping and Vector Quantisation," IEE Vision Image and Signal Processing, vol. 142, No. 5, pp. 313-318, Oct. 1995.

J.M. Naik, L.P. Netsch, and G.R. Doddington, "Speaker Verification Over Long Distance Telephone Lines," In Proceedings of ICASSP, pp. 524-527, 1989.

J.L. Gauvain, C.H. Lee, "Maximum a Posteriori Estimation for Multivariate Gaussian Mixture Observations of Markov Chains," IEEE Transactions on Speech and Audio Processing, vol. 2, No. 2, pp. 291-298, Apr. 1994.

I. Illina, Y. Gong, "Elimination of Trajectory Folding Phenomenon: HMM, Trajectory Mixture HMM and Mixture Stochastic Trajectory Model," In Proceedings of IEEE International Conference on Acoustics, Speech and Signal Processing, vol. 2, pp. 1395-1398, 1997.

A. Ariyaeeinia and P. Sivakumaran, "Analysis and Comparison of Score Normalization Methods for Text Dependent Speaker Verification," In Eurospeech, pp. 1379-1382, 1997.

R. Auckenthalter, M. Carey and H. Lloyd-Thomas, "Score Normalization for Text-Independent Speaker Verification Systems," 10:4254, 2000.

R. Finan, A. Sapeluk, and R. Damper, "Imposter Cohort Selection for Score Normalization in Speaker Verification," Pattern Recognition Letters, vol. 18, No. 9, pp. 881-888, 1997.

T. Kinnunen, E. Karpov, and P. Frnti, "Efficient Online Cohort Selection Methods for Speaker Verification," In Proceedings of $8^{th}$ Int. Conf. on Spoken Language Processing, vol. 3, pp. 2401-2402, 2004.

D. Reynolds, T. Quatieri, and R. Dunn, "Speaker Verification Using Adapted Gaussian Mixture Models," 10:19-41, 2000.

P. Sivakumaran, J. Fortuna and A. Ariyaeeinia, "Score Normalization Applied to Open-Set, Text-Independent Speaker Identification," In Eurospeech, pp. 2669-2672, 2003.

Y. Zigel and A. Cohen, "On Cohort Selection for Speaker Verification," In Eurospeech, 2003, pp. 2977-2980.

An Official Search Report and Written Opinion of the International Searching Authority in counterpart foreing application No. PCT/US2007/004137 filed Jul. 23, 2007.

* cited by examiner

SPEAKER AUTHENTICATION USING ADAPTED BACKGROUND MODELS

BACKGROUND

Speaker authentication is the process of verifying the claimed identity of a speaker based on a speech signal. The authentication is typically performed using speech models that have been trained for each person who uses the system.

In general, there are two types of speaker authentication, text-independent and text-dependent. In text-independent speaker authentication, the speaker provides any speech content that they want to provide. In text-dependent speaker authentication, the speaker recites a particular phrase during model training and during use of the authentication system. By repeating the same phrase, a strong model of the phonetic units and transitions between those phonetic units can be constructed for the text-dependent speaker authentication system. This is not as true in text-independent speak authentication systems since many phonetic units and many transitions between phonetic units will not be observed during training and thus will not be represented well in the models.

The discussion above is merely provided for general background information and is not intended to be used as an aid in determining the scope of the claimed subject matter.

SUMMARY

Speaker Authentication is Performed by determining a similarity score for a test utterance and a stored training utterance. Computing the similarity score involves determining the sum of a group of functions, where each function includes the product of a posterior probability of a mixture component and a difference between an adapted mean and a background mean. The adapted mean is formed based on the background mean and the test utterance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
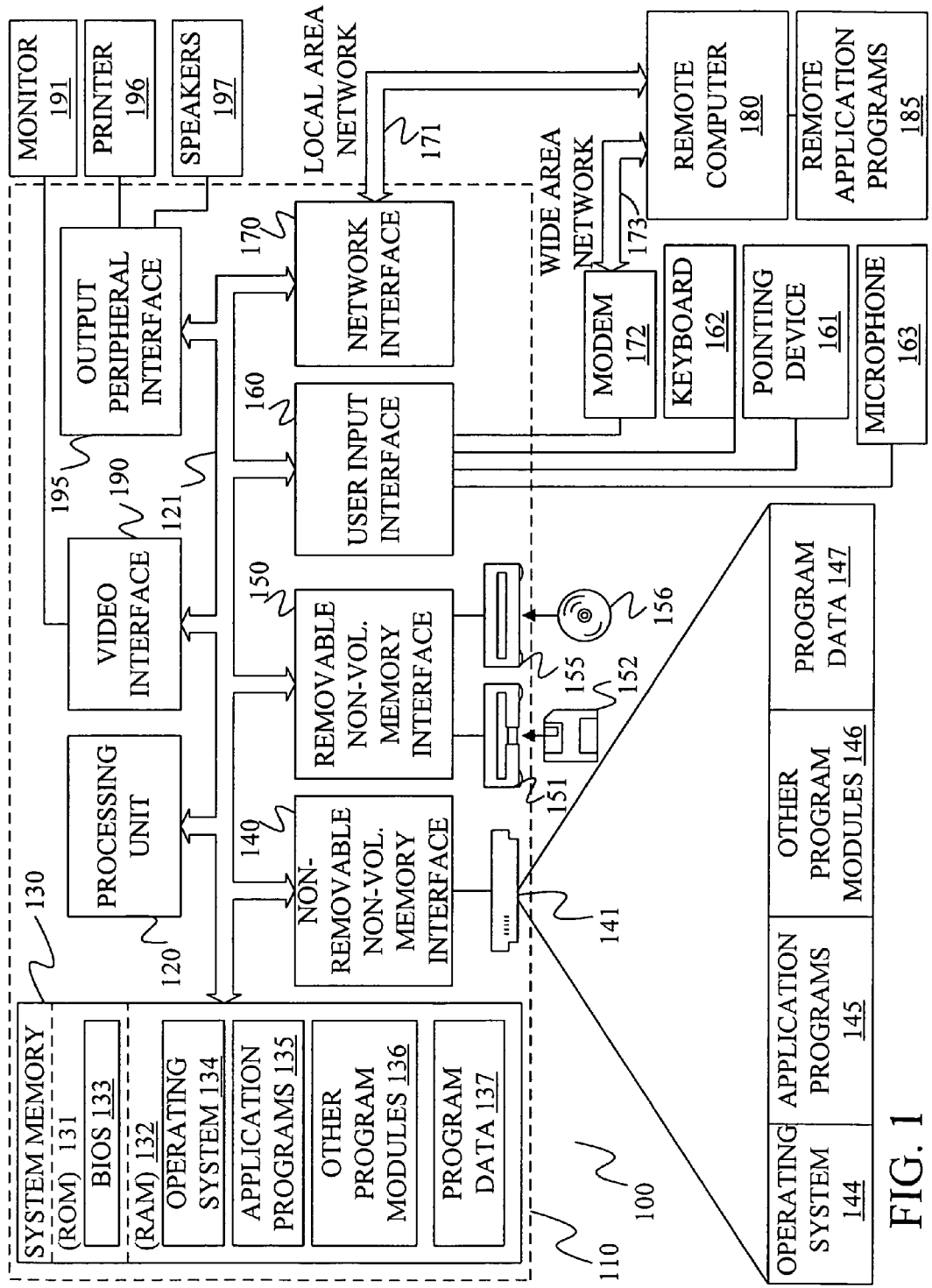
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
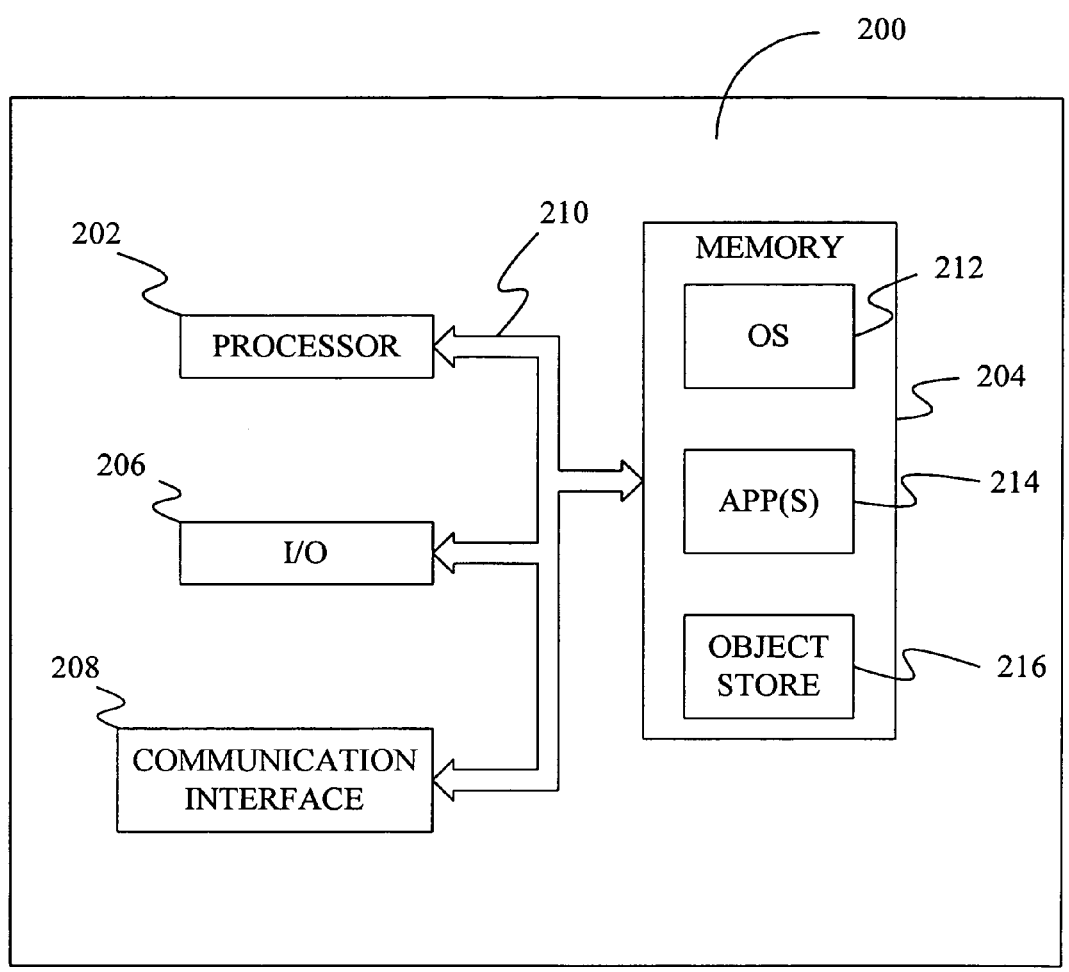
FIG. 2 is a block diagram of an alternative computing environment in which some embodiments may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Text-Independent Speaker Verification

Under one embodiment of the present invention, a text-independent speaker authentication system is provided which authenticates a test speech signal by forming a similarity measure that is based on a model adapted to training speech for a user and a model adapted to the test speech signal. In particular, the similarity measure uses the differences between the two adapted models and a background model.

In one embodiment, the background model is a Gaussian Mixture Model that is defined as:

$$P(x_t | \lambda_0) = \sum_{i=1}^{M} w_i P_i(x_t | \lambda_0) = \sum_{i=1}^{M} w_i N(x_t : m_i, \Sigma_i) \qquad \text{EQ. 1}$$

where M is the number of mixture components in the model, $w_i$ is a weight for the ith mixture component, $m_i$ is the mean for the ith mixture component and $\Sigma_i$ is the covariance matrix of the ith component. Notation $\lambda_0$ denotes the set of parameters of the background model (the weight, mean and covariance for each component).

The background model is adapted to training speech using the following equations:

$$\hat{\gamma}(i | \hat{x}_t) = \frac{w_i P_i(\hat{x}_t | \lambda_0)}{\sum_{j=1}^{M} w_j P_j(\hat{x}_t | \lambda_0)} \qquad \text{EQ. 2}$$

$$\hat{\gamma}(i) = \sum_{t=1}^{T} \hat{\gamma}(i | \hat{x}_t) \qquad \text{EQ. 3}$$

$$\tilde{m}_i = \frac{1}{\hat{\gamma}(i)} \sum_{t=1}^{T} \hat{\gamma}(i | \hat{x}_t) \hat{x}_t \qquad \text{EQ. 4}$$

$$\hat{m}_i = m_i + \frac{\hat{\gamma}(i)}{\hat{\gamma}(i) + \alpha}(\tilde{m}_i - m_i) \qquad \text{EQ. 5}$$

$$\hat{\Sigma}_i = \Sigma_i \qquad \text{EQ. 6}$$

where $\hat{x}_t$ is a training feature vector from a particular speaker, $\hat{\gamma}(i|\hat{x}_t)$ is the posterior probability of the ith mixture component given the feature vector from the speaker, T is the number of frames in the training utterance from the particular speaker, $\hat{\gamma}(i)$ is the soft count of the frames belonging to the ith mixture component across the entire training utterance from the particular speaker, and $\alpha$ is a smoothing factor that causes the mean $\hat{m}_i$ of the adapted model to adopt the mean of the background model if there are few observed frames for the ith mixture component in the training utterance. Note that in the embodiment described above, the covariance for the adapted model is equal to the covariance for the background model.

Under one embodiment, the similarity measure is defined as:

$$LLR(x_1^T) \leq \frac{\sum_{i=1}^{M} \gamma(i) \frac{\hat{\gamma}(i)}{\hat{\gamma}(i)+\alpha} \hat{\delta}_i \Sigma_i^{-1} \left( \delta_i - \frac{\hat{\gamma}(i)}{\hat{\gamma}(i)+\alpha} \frac{\hat{\delta}_i}{2} \right)}{\sum_{i=1}^{M} \gamma(i)} \qquad \text{EQ. 7}$$

where $$\delta_i = \overline{m}_i - m_i \qquad \text{EQ. 8}$$

$$\hat{\delta}_i = \hat{m}_i - m_i \qquad \text{EQ. 9}$$

$$\gamma(i) = \sum_{t=1}^{T} \gamma(i | x_t) \qquad \text{EQ. 10}$$

where $x_t$ is a feature vector of the test utterance, T is the number of frames of the test utterance and $\overline{m}_i$ is the sample mean of the test utterance which is defined as:

$$\overline{m}_i = \frac{1}{\gamma(i)} \sum_{t=1}^{T} \gamma(i | x_t) x_t \qquad \text{EQ. 11}$$

Thus, in the similarity measure of equation 7, a product is formed from the posterior probability $\gamma_i$ for the test utterance, the difference, $\delta_i$, between an adapted mean for the test speaker and a background mean and the difference, $\delta_i$, between a sample mean for the test utterance and a background mean.

Under one embodiment, the similarity measure of EQ. 7 is simplified to:

$$LLR_0 = \frac{\sum_{i=1}^{M} \gamma(i) \hat{\gamma}(i) \hat{\delta}_i \Sigma_i^{-1} \delta_i}{\sum_{i=1}^{M} \gamma(i) \hat{\gamma}(i)} \qquad \text{EQ. 12}$$

Under a further embodiment, to reduce the data dependency of $LLR_0$ in EQ. 12, normalization is performed by carefully choosing thresholds. Under one embodiment, the thresholds are constructed by first selecting subsets of adapted model parameters from a set or pool of model parameters that have been adapted from utterances from multiple speakers. One subset of adapted model parameters is chosen by identifying utterances represented by parameters in the pool of parameters that are most similar to the training utterance. A second subset of model parameters is chosen by identifying utterances represented by model parameters in the pool of parameters that are most similar to the test utterance.

Under one embodiment, the similarity determinations are made using equation 12 above.

For example, when locating similar utterances to the training utterance, model parameters for an utterance taken from the pool of model parameters are applied as the model parameters of the test utterance in EQ. 12 while the model parameters for the training utterance are used directly in EQ. 12. When locating utterances that are similar to the test utterance, the model parameters for an utterance taken from the pool of model parameters are used as the training utterance model parameters and the test utterance model parameters are used directly in EQ. 12.

Once a subset of similar utterances, known as a cohort speaker set, has been selected for both the training utterance and the test utterance, the thresholds can be set as:

$$\hat{t}_i^0 = \frac{1}{N_{cohort}} \sum_{k=1}^{N_{cohort}} \hat{\delta}_i \Sigma_i^{-1} \delta_i^k \quad \text{EQ. 13}$$

$$t_i^0 = \frac{1}{N_{cohort}} \sum_{s=1}^{N_{cohort}} \delta_i \Sigma_i^{-1} \delta_i^s \quad \text{EQ. 14}$$

where $\hat{t}_i^0$ is the threshold for the training utterance at the ith mixture component, $t_i^0$ is the threshold for the test utterance at the ith mixture component, $N_{cohort}$ is the number of adapted models selected from the speaker pool to form the threshold, $\hat{\delta}_i$ is the adjustment of the ith component of the training utterance as defined in EQ. 9, $\delta_i$ is the adjustment of the ith component of the test utterance defined in EQ. 8, $\delta_i^k$ is the adjustment of the ith component of cohort speaker k selected for the training utterance and $\delta_i^s$ is the adjustment of the ith component of the cohort speaker s selected for the test utterance where:

$$\delta_i^k = m^k - m \quad \text{EQ. 15}$$

$$\delta_i^s = m^s - m \quad \text{EQ. 16}$$

where $m^k$ is the mean for the mth cohort utterance and $m^s$ is the mean for the sth cohort utterance.

Using these thresholds, the normalized $LLR_0$ is:

$$LLR_1 = \frac{\sum_{i=1}^{M} \gamma(i)\hat{\gamma}(i)[\hat{\delta}_i \Sigma_i^{-1} \delta_i - (\hat{t}_i^0 + t_i^0)/2]}{\sum_{i=1}^{M} \gamma(i)\hat{\gamma}(i)} \quad \text{EQ. 17}$$

The similarity measure of EQ. 17 may be used directly to authenticate a test utterance against a training utterance. In some embodiments, this similarity measure is used iteratively to select a new cohort speaker set for both the training utterance and the test utterance. This new cohort speaker set is then used to establish a new threshold. Note that since the similarity test of EQ. 17 is different from the similarity test of EQ. 12, the cohort sets selected using EQ. 17 will be different from the cohort sets selected using EQ. 12. Using the new cohort sets, a new threshold is defined as:

$$\hat{t}_i^1 = \frac{1}{N_{cohort}} \sum_{k=1}^{N_{cohort}} [\hat{\delta}_i \Sigma_i^{-1} \delta_i^k - (\hat{t}_i^0 + t_i^0)/2] \quad \text{EQ. 18}$$

$$t_i^1 = \frac{1}{N_{cohort}} \sum_{s=1}^{N_{cohort}} [\hat{\delta}_i \Sigma_i^{-1} \delta_i^s - (\hat{t}_i^0 + t_i^0)/2] \quad \text{EQ. 19}$$

A new similarity measure can then be defined as:

$$LLR_2 = \frac{\sum_{i=1}^{M} \gamma(i)\hat{\gamma}(i)[\hat{\delta}_i \Sigma_i^{-1} \delta_i - (\hat{t}_i^0 + t_i^0)/2 - (\hat{t}_i^1 + t_i^1)/2]}{\sum_{i=1}^{M} \gamma(i)\hat{\gamma}(i)} \quad \text{EQ. 20}$$

This type of iteration, in which cohorts are selected from a similarity test, new thresholds are defined from the cohorts, and a new similarity measure is defined from the new thresholds, can be repeated as many times as needed with each new similarity test being defined by subtracting the average of the two new thresholds from the average of the previous thresholds in the numerator of the previous similarity measure.

Figure 3:
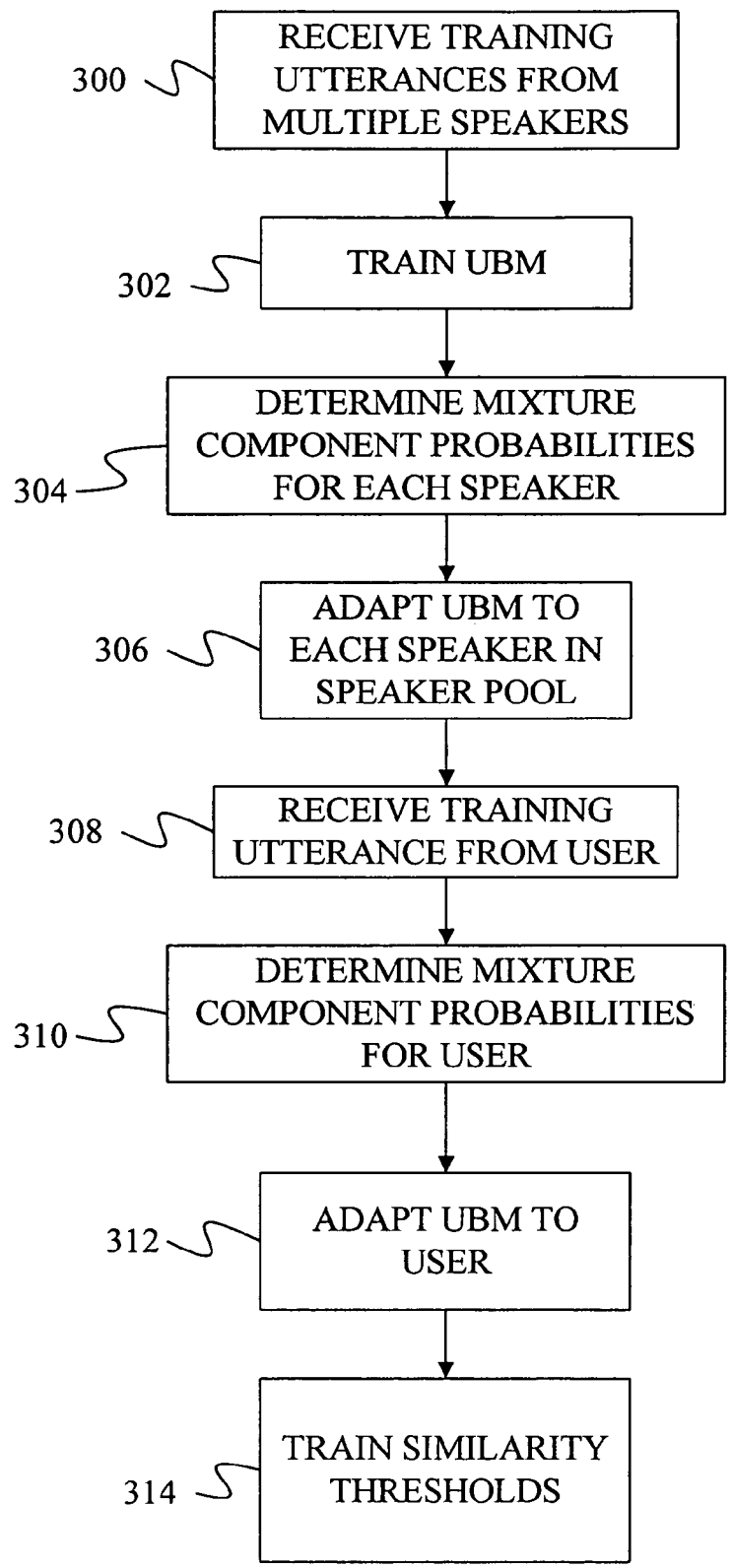
FIG. 3 is a flow diagram of a method of training a text-independent authentication system.
Figure 4:
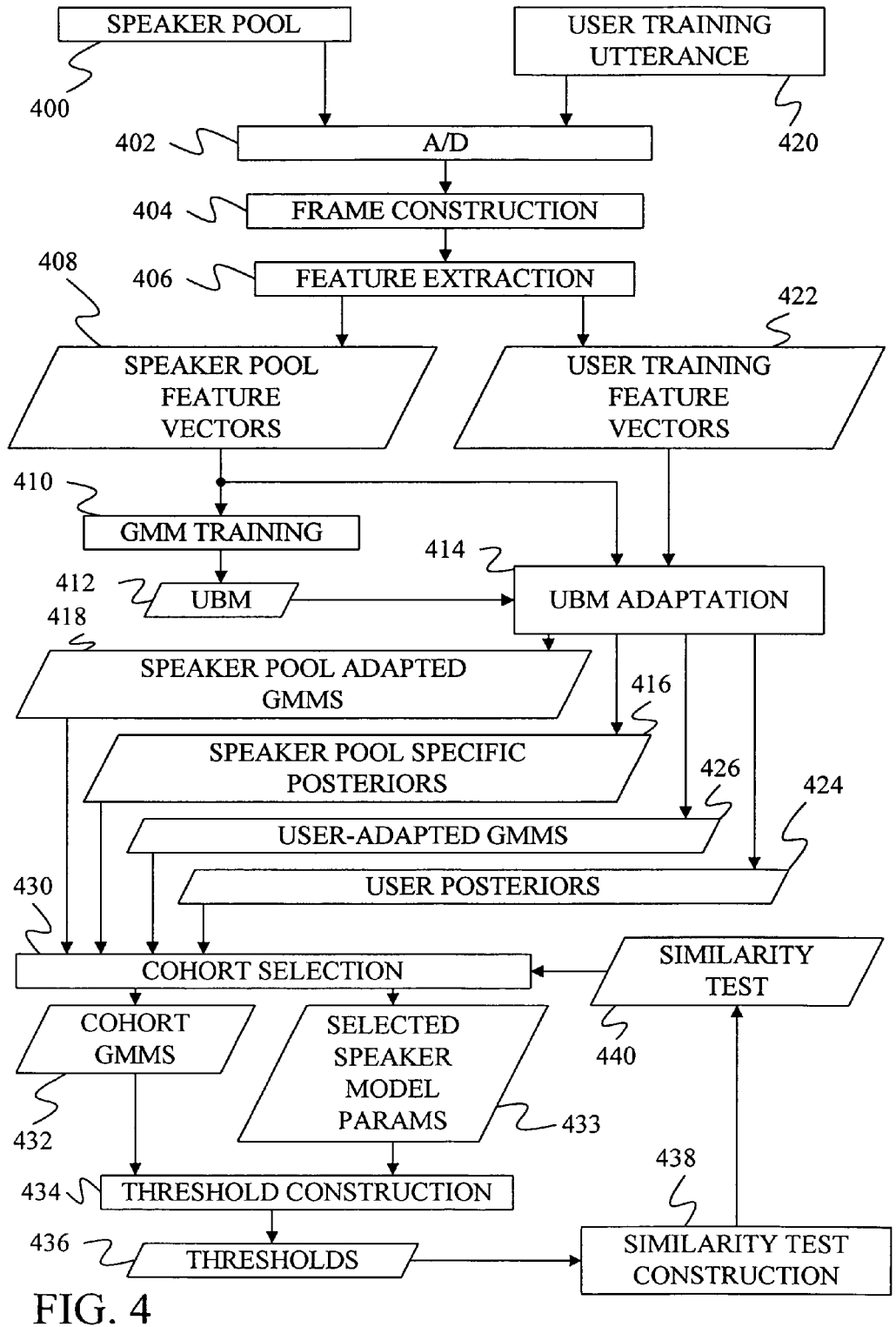
FIG. 4 is a block diaphragm of elements used to train a text-independent authentication system.

FIG. 3 provides a flow diagram of a method for training model parameters used in speaker authentication under one embodiment of the invention. FIG. 4 provides a block diagram of elements used to construct these model parameters.

At step 300, utterances from multiple speakers in a speaker pool 400 are received. These utterances are converted into sequences of digital values by an analog-to-digital converter 402 and grouped into frames by a frame constructor 404. The frames of digital values are then converted into feature vectors by a feature extractor 406. Under one embodiment, the feature extractor is a Mel-Frequency cepstral coefficient (MFCC) feature extractor that forms MFCC feature vectors with delta coefficients. Such MFCC feature extraction units are well known in the art. This produces a speaker pool of feature vectors 408.

At step 302, the speaker pool feature vectors are applied to a Gaussian Mixture Model trainer 410 which uses the feature vectors to define a Universal Background Model (UBM) 412, which in one embodiment takes the form of a Gaussian Mixture Model. Such training involves grouping the feature vectors into mixture components and identifying Gaussian distribution parameters for each mixture component. In particular, a mean and a covariance matrix are determined for each mixture component.

At step 304 a UBM adaptation unit 414 determines a speaker pool posterior probability 416 for each mixture component for each speaker in speaker pool 400 using EQs. 2 and 3 above. At step 306, UBM adaptation unit 414 uses the posterior probabilities to determine speaker pool adapted Gaussian Mixture Models 418 for each speaker in speaker pool 400 using EQs. 4 through 6 above. In EQs. 2-6, the utterances for a particular speaker are combined to form a single utterance, which forms the sequence of feature vectors, $\hat{x}_1^T$, where T is the total number of frames across all of the utterances of the speaker.

At step 308, a training utterance 420 from a future user of the system is received and is converted into user training feature vectors 422 using analog-to-digital converter 402, frame constructor 404 and feature extractor 406. At step 310, UBM adaptation unit 414 identifies user posterior probabilities 424 using EQs. 2 and 3 above and forms user-adapted Gaussian Mixture Models 426 using EQs. 4 through 6 above. Note that steps 308, 310 and 312 are repeated for each person who will use the verification system.

At step 314, similarity thresholds are trained. The method for training these thresholds is shown in the flow diagram of FIG. 5. The method shown in FIG. 5 is an iterative method that sets thresholds not only for every user of the verification system, but also for every speaker in the speaker pool.

Figure 5:
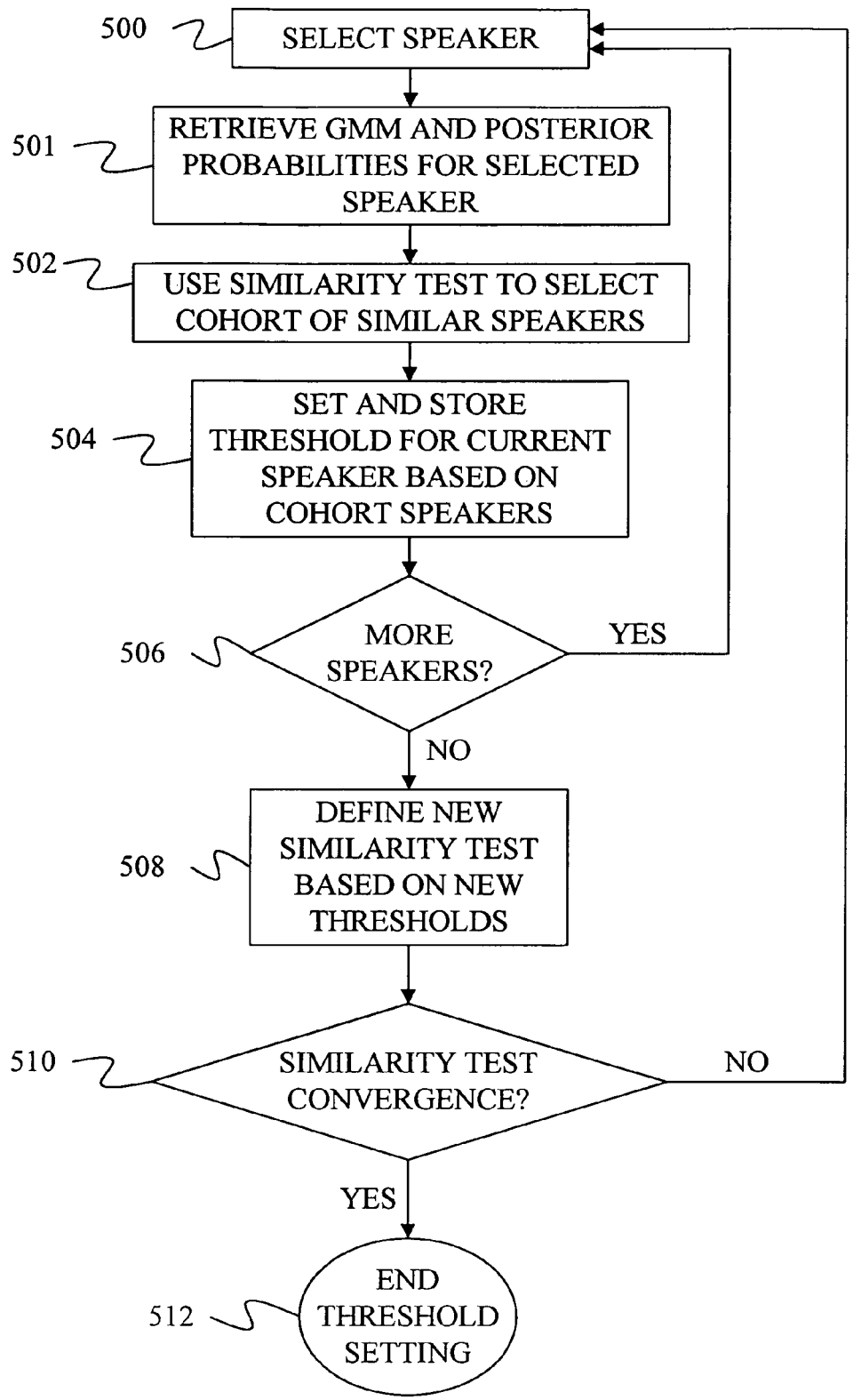
FIG. 5 is a flow diagram of a method for setting thresholds during training.

In step 500 of FIG. 5, a speaker, either a speaker from the speaker pool or a user of the system, is selected. At step 501, the Gaussian Mixture Model parameters and the posterior probabilities for the selected speaker are retrieved as selected speaker model parameters 433.

At step 502, a similarity test 440 is used by cohort selection unit 430 to select a cohort of speakers from speaker pool 400. During this step, the model parameters ($\gamma(i),m$) associated with each speaker in the speaker pool are separately applied to the similarity test along with the model parameters ($\hat{\gamma}(i),\hat{m}$) 433 for the currently selected speaker. The subset of speakers from the speaker pool that produce the highest similarity measure for the currently selected speaker are selected as the cohort resulting in a set of cohort model parameters 432. Under one embodiment, the similarity test of equation 12 is used as similarity test 440 during the initial iteration.

At step 504, a threshold construction unit 434 uses cohort model parameters 432 and the selected speaker model parameters 433 to construct a threshold 436 for the selected speaker. Under one embodiment, EQ. 13 is used to compute the threshold with the means from selected speaker model parameters 433 being used to define the adjustment value $\hat{\delta}_i$ and the means for cohort model parameters 432 being used to define $\delta_i^k$ for each cohort.

At step 506, the method of FIG. 5 determines if there are more speakers in the speaker pool or in the set of users of the system. If there are more speakers, the next speaker is selected by returning to step 500, and similarity test 440 is used again to identify cohorts for the new speaker. A threshold is then determined for the new speaker. Steps 500, 502, 504 and 506 are repeated until thresholds have been determined for every speaker in the speaker pool and every user of the system.

When there are no further speakers, a similarity test construction unit 438 constructs a new similarity test 440 at step 508. Under one embodiment, the new similarity test is defined as EQ. 17 above.

At step 510, the method determines if the similarity tests have converged. If the tests have not converged, the process returns to step 500 where a speaker is selected from the speaker pool or from the set of users of the system. Step 502 is then used to select the cohort speakers, this time using the new similarity test 440 set by similarity test construction unit 438. New thresholds 436 are then determined at step 504 using the newly selected cohorts. For example, under some embodiments, EQ. 18 is used to determine the new thresholds at step 504 during the second iteration. Steps 500, 502, 504 and 506 are repeated for each speaker in the speaker pool and each user of the system. After the new thresholds have been determined for each speaker, a new similarity test is defined at step 508. For example, during the second iteration, the new similarity test would be defined as found in EQ. 20. The iterations of determining cohorts using a similarity test, defining thresholds from the cohorts, and redefining the similarity test based on the new thresholds, are iteratively repeated until the similarity tests converge at step 510 such that changes in the similarity test do not change the selected cohort speaker set. The step of setting thresholds during training then ends at step 512.

Figure 6:
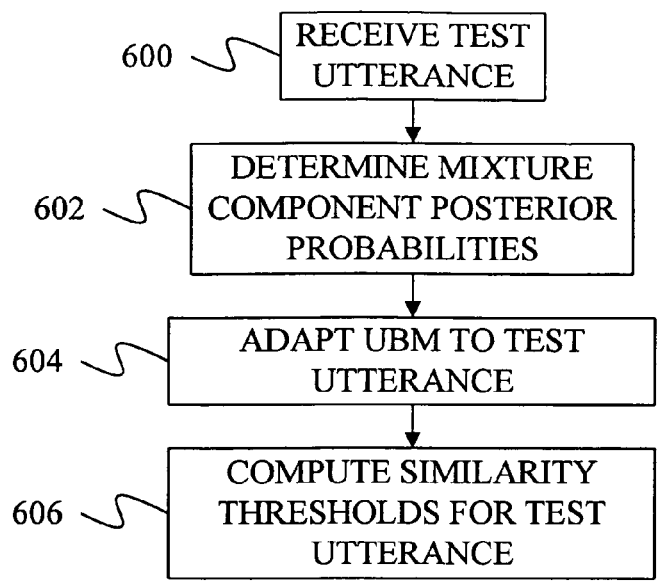
FIG. 6 is a flow diagram of a method of identifying model parameters for a test utterance.
Figure 7:
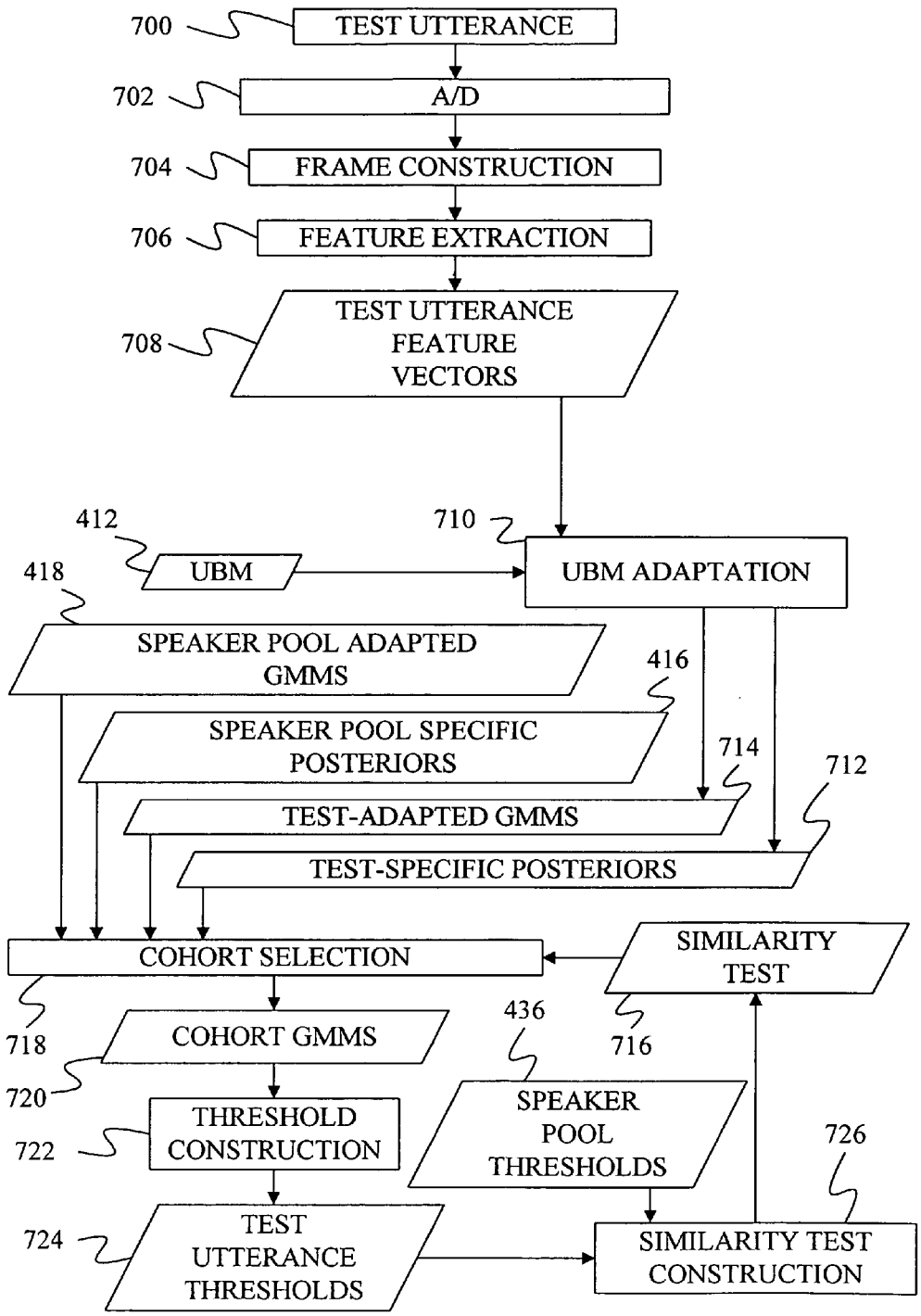
FIG. 7 is a block diagram of elements used in the methods of FIGS. 6 and 8.

Once the models have been adapted and the thresholds set for each speaker in the speaker pool and each user of the system, the system may be used to authenticate a user. Authentication begins by setting model parameters for a test utterance as shown in the flow diagram of FIG. 6 and the block diagram of FIG. 7. In step 600 of FIG. 6, a test utterance 700 of FIG. 7 is received. The test utterance is converted into a sequence of digital values by an analog-to-digital converter 702 and grouped into frames by a frame construction unit 704. The frames of digital values are applied to a feature extractor 706, which performs the same feature extraction as feature extractor 406 of FIG. 4 to produce test utterance feature vectors 708.

At step 602, an adaptation unit 710 forms test-specific posterior probabilities 712 based on universal background model 412 using equations 2 and 3 above. At step 604 the universal background model is adapted by adaptation until 710 to form test adapted GMMs 714 using EQs. 4 through 6 above, with the test utterance being used as $\hat{x}_t$.

At step 606, similarity thresholds 724 are determined for the test utterance. A method of determining the similarity thresholds is shown in more detail in the flow diagram of FIG. 8.

Figure 8:
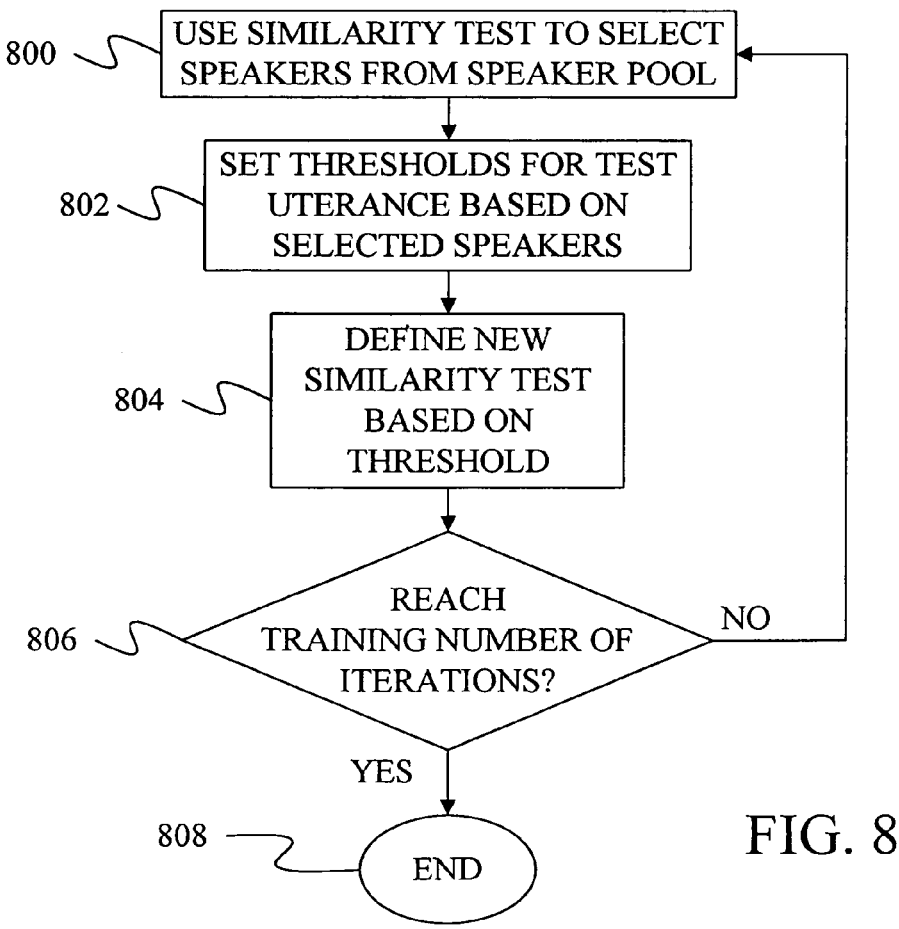
FIG. 8 is a flow diagram of a method for determining thresholds for a test utterance.

At step 800 of FIG. 8, a similarity test 716 is used by a cohort selection unit 718 to find those speakers in the speaker pool that are most similar to the test speaker. During this step, the model parameters ($\gamma(i),m$) associated with each speaker in the speaker pool are separately applied to the similarity test along with the model parameters ($\hat{\gamma}(i),\hat{m}$) 712, 714 for the test utterance. The subset of speakers from the speaker pool that produce the highest similarity measure for the currently selected speaker are selected as the cohort resulting in a set of cohort model parameters 720. Under one embodiment, the similarity test of equation 12 is used as similarity test 716 during the initial iteration.

At step 802, a threshold construction unit 722 uses cohort model parameters 720 and test-adapted GMMs 714 to form test utterance thresholds 724. Under one embodiment, EQ. 14 is used to compute the threshold with the means from the test-adapted GMMs 714 being used to define the adjustment value $\delta_i$ and the means for cohort model parameters 720 being used to define $\delta_i^s$ for each cohort.

At step 804, a new similarity test 716 is formed by a similarity test construction unit 726 using test utterance thresholds 724 set in step 802 and speaker pool thresholds 436 set in the method of FIG. 5. Under one embodiment, the similarity test of EQ. 17 is used as the new similarity test 716. At step 806, the method determines if the same number of iterations have been reached as were performed in the flow diagram of FIG. 5. If the same number of iterations have not been performed, the new similarity test is used to select a new set of cohorts by returning to step 800. The new cohorts 720 are used by threshold construction unit 722 to form new test utterance thresholds, which are added to test speaker thresholds 724. The new thresholds are used by similarity test construction unit 726 in step 804 to form a new similarity test such as the similarity test of EQ. 20. Steps 800, 802, 804 and 806 are repeated until the same number of iterations has been performed in the method of FIG. 8 as was performed in the method of FIG. 5 resulting in a final similarity test 716 that has the same number of thresholds as the final similarity test 440 formed through the flow diagram of FIG. 5. When the same number of iterations has been reached, the process for computing similarity thresholds for the test utterance ends at step 808.

Figure 9:
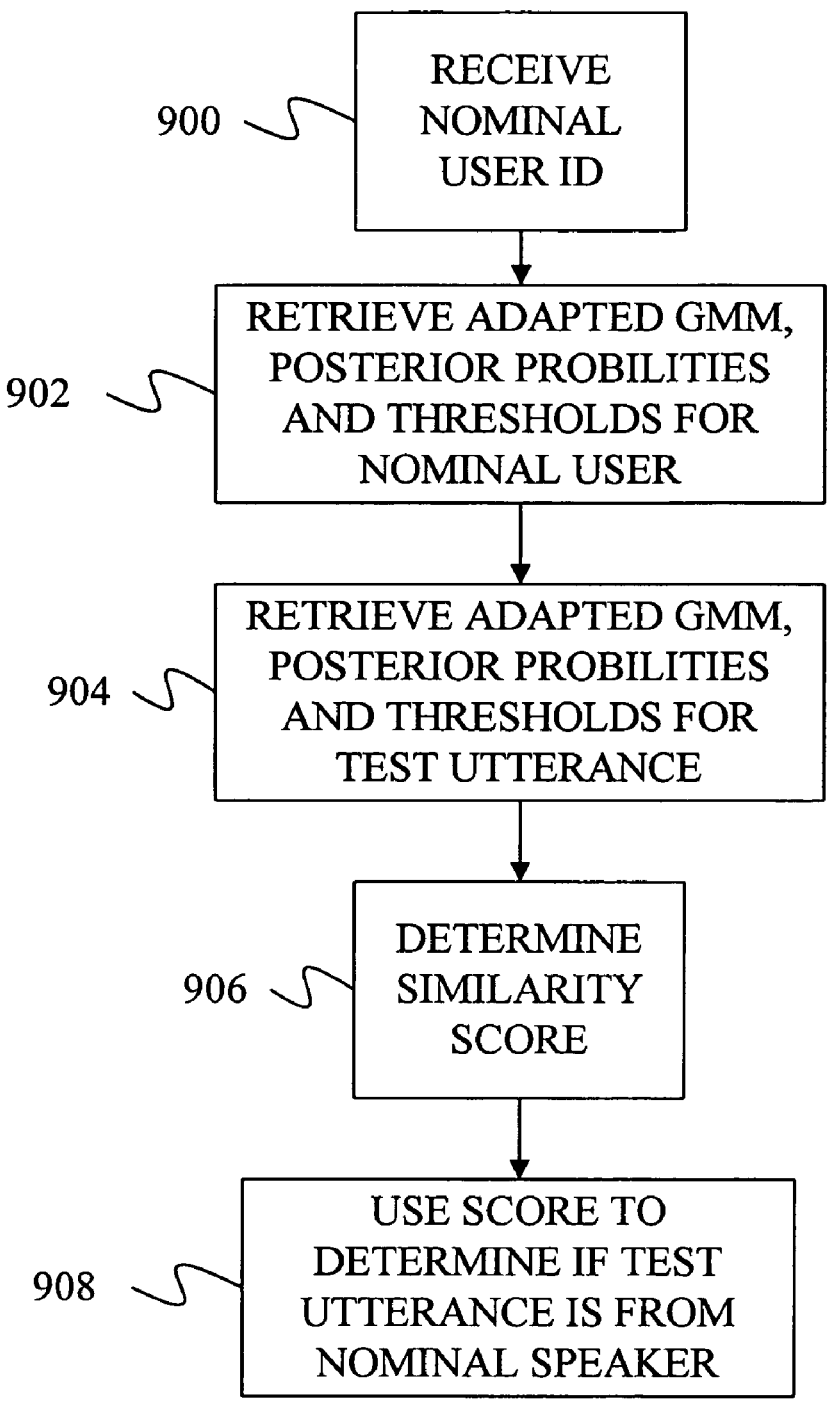
FIG. 9 is a flow diagram of a method of authenticating a test utterance.
Figure 10:
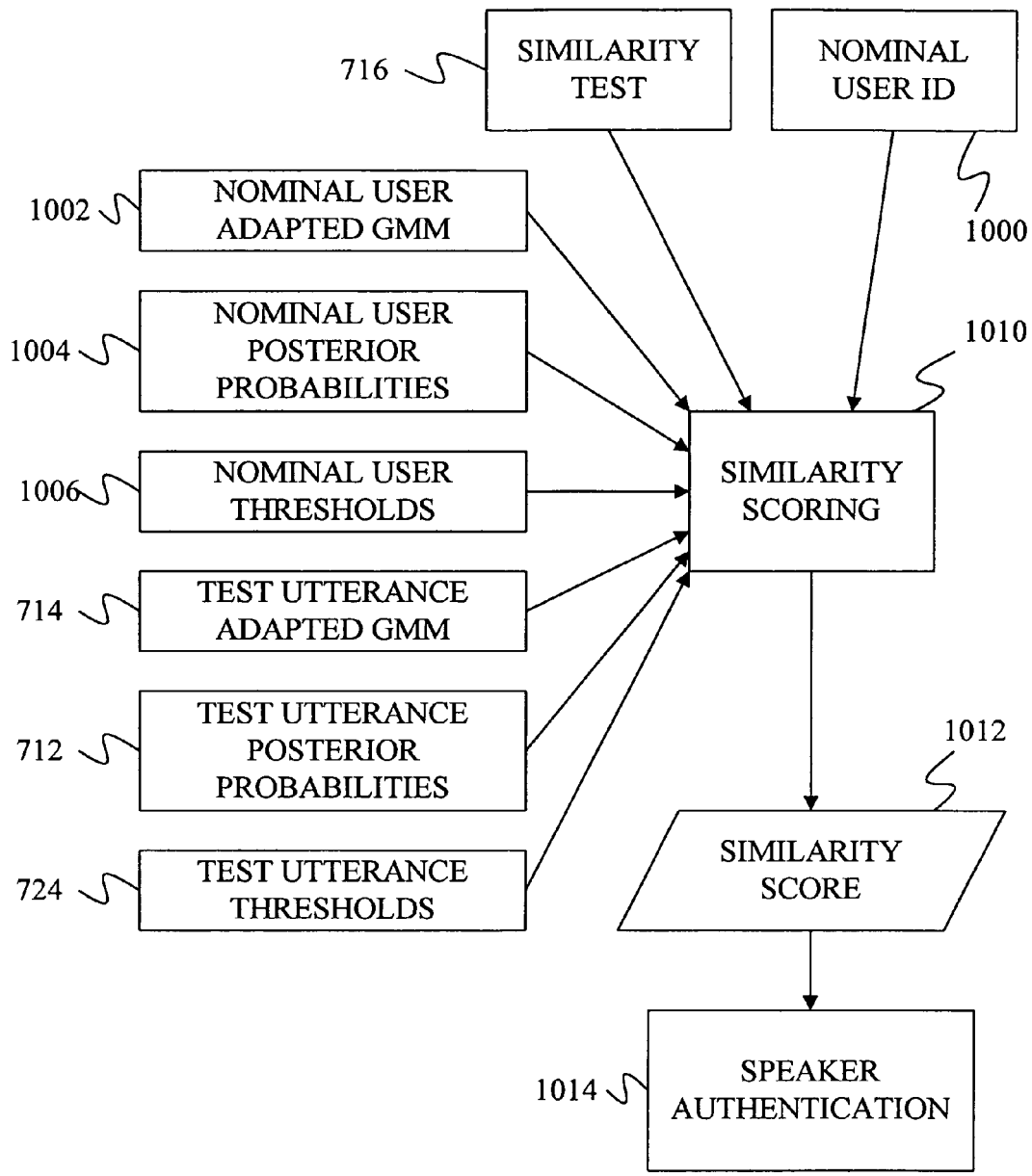
FIG. 10 is a block diagram of elements used to authenticate a test utterance.

Speaker authentication continues with the process shown in FIG. 9 using the elements of the block diagram of FIG. 10. In step 900, a nominal user identification 1000 is received. Using the nominal user identification, adapted Gaussian Mixture Models 1002, posterior probabilities 1004 and thresholds 1006 for the nominal user are retrieved at step 902. These parameters were determined from training utterances from the nominal user in the flow diagram of FIG. 3.

At step 904, test utterance adapted Gaussian Mixture Models 714, test utterance posterior probabilities 712 and test utterance thresholds 724 of FIG. 7 are retrieved.

At step 906, final similarity test 716 is used by a similarity scoring module 1010 to form a similarity score 1012 between the test utterance model parameters 712, 714, 724 and the nominal user model parameters 1002, 1004, 1006. Under one embodiment, final similarity test 716 is the similarity test of EQ. 20. At step 908, similarity score 1012 is used by a speaker authentication unit 1014 to make a decision as to whether the test utterance is from the user identified by the nominal user ID 1000.

Text-Dependent Speaker Authentication

Figure 11:
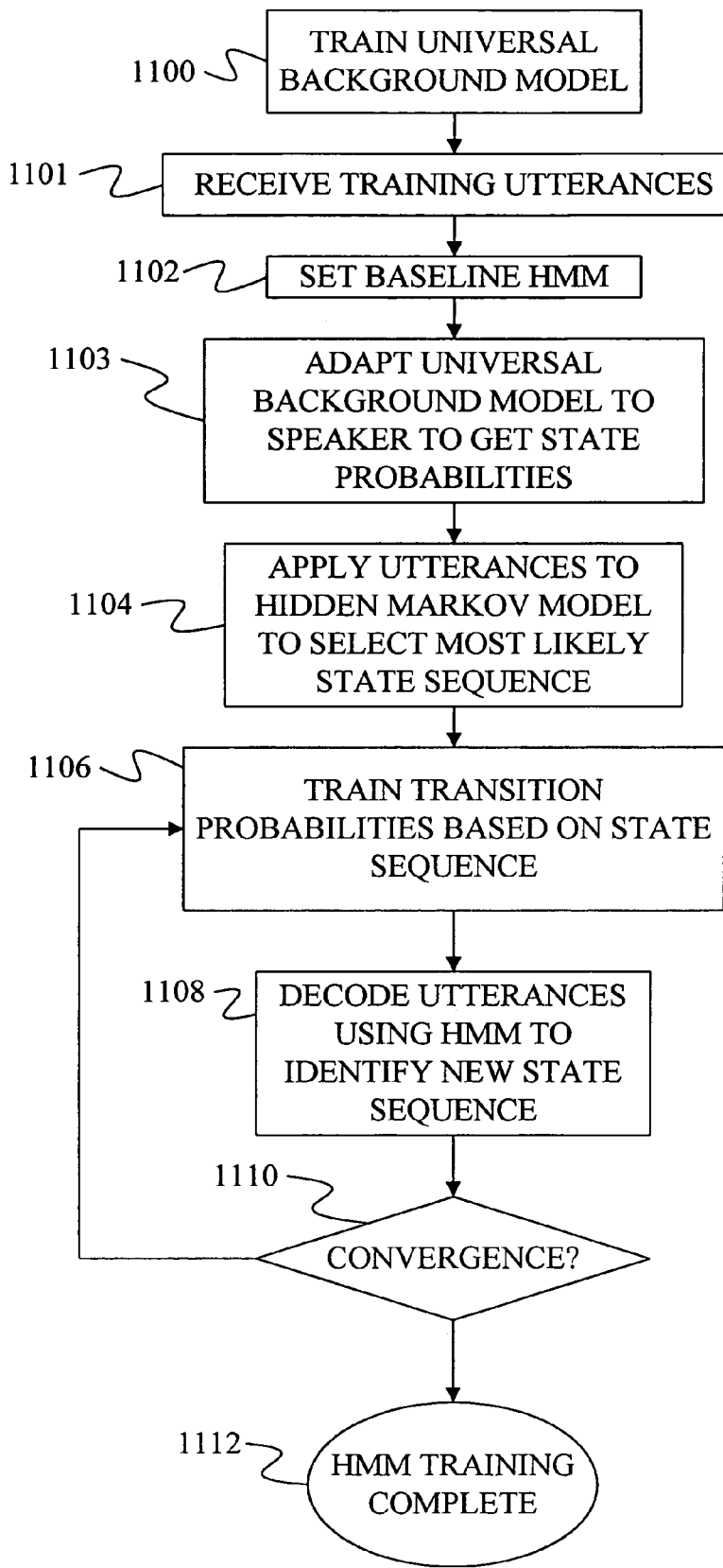
FIG. 11 is a flow diagram of a method of training a Hidden Markov Model for a text-dependent authentication system.
Figure 12:
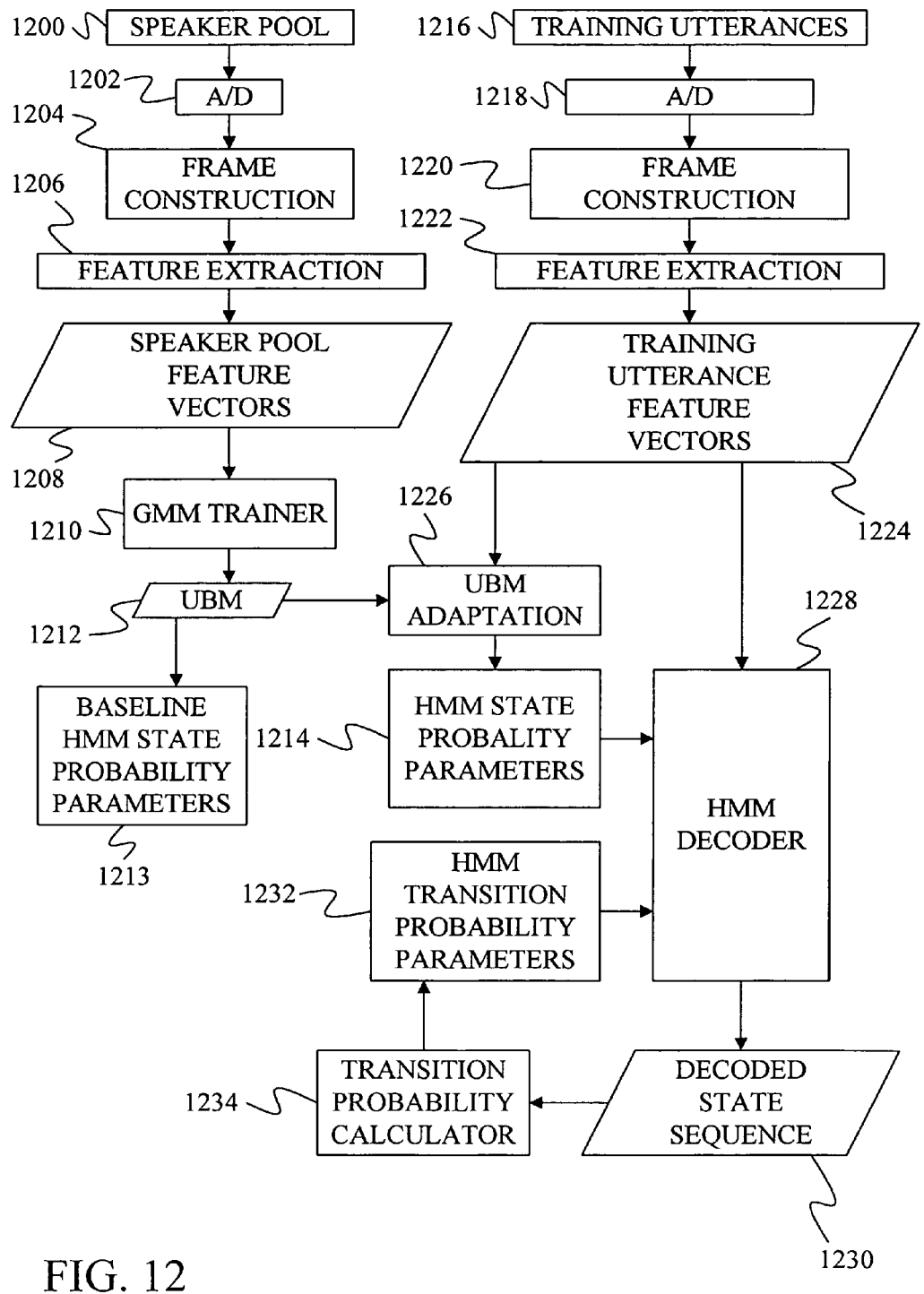
FIG. 12 is a block diagram of elements used to train a Hidden Markov Model.

Under a further embodiment of the present invention, a text-dependent speaker authentication system is provided in which a Hidden Markov Model is constructed and is used to perform speaker authentication. FIG. 11 provides a method for training such a Hidden Markov Model and FIG. 12 provides a block diagram of elements used in training the Hidden Markov Model.

In step 1100 of FIG. 11, a text-independent universal background model is trained. Under one embodiment, the universal background model is a Gaussian Mixture Model that is trained by collecting text-independent speech from many different speakers in a speaker pool 1200. Each utterance in speaker pool 1200 is converted into a sequence of digital values by an analog-to-digital converter 1202 and the digital values are grouped into frames by a frame construction unit 1204. For each frame, a feature extraction unit 1206 extracts a feature vector, which in one embodiment is a Mel-frequency cepstral coefficient with deltas vector. The extracted feature vectors 1208 are applied to a Gaussian Mixture Model trainer 1210 to form the universal background model 1212. Gaussian Mixture Model trainers are well known in the art and form Gaussian Mixture Models by grouping feature vectors into mixture components and identifying Gaussian parameters that describe the distribution of feature vectors assigned to each component.

At step 1101, training utterances 1216 are received and are converted into digital values by an analog-to-digital converter 1218 and grouped into frames by a frame construction unit 1220. For each frame, a feature extraction unit 1222 extracts a feature vector thereby forming training feature vectors 1224, which are the same type of vectors as speaker pool feature vectors 1208. Under one embodiment, training utterances 1216 are formed by a single speaker repeating a word or phrase.

At step 1102, universal background model 1212 is used to define baseline Hidden Markov Model state probability parameters 1213. Under one embodiment, this is performed by setting the mean and covariance of each mixture component as the mean and covariance of a corresponding Hidden Markov Model state.

At step 1103, universal background model 1212 is adapted to a particular speaker by an adaptation unit 1226 and converted into HMM state probability parameters 1214. In particular, training feature vectors 1224 are provided to Gaussian Mixture Model adaptation unit 1226, which also receives universal background model 1212. Gaussian Mixture Model adaptation unit 1226 adapts the universal background model using EQs. 2 through 6 above while using the training feature vectors as $\hat{x}_t$. The resulting mean and covariance for each mixture component are stored as model parameters for a corresponding HMM state probability distribution. Thus, each mixture component represents a separate HMM state.

At step 1104, training feature vectors 1224 are applied to a Hidden Markov Model decoder 1228, which decodes the sequence of feature vectors to identify a sequence of HMM states 1230 that are most probable given the sequence of feature vectors 1224. To perform this decoding, HMM decoder 1228 utilizes HMM state probability parameters 1214 and an initial set of HMM transition probability parameters 1232. Under one embodiment, the HMM transition probabilities are initially set to a uniform value such that the probability of transitioning between two states is the same for all states.

At step 1106, the decoded state sequence 1230 is used by a transition probability calculator 1234 to train HMM transition probability parameters 1232. This calculation involves counting the number of transitions between various states and assigning probabilities to each transition based on the counts. At step 1108, training feature vectors 1224 are once again decoded by HMM decoder 1228, this time using the new HMM transition probability parameters 1232 and HMM state probability parameters 1214. This forms a new decoded state sequence 1230. At step 1110, the method determines if the decoded state sequence has converged. If it has not converged, the new state sequence is used to retrain the HMM transition probability parameters 1232 by returning to step 1106. Training feature vectors 1224 are again decoded using the new transition probability parameters at step 1108. Steps 1106, 1108 and 1110 are repeated until the output HMM state sequence is stable, at which the HMM training is complete at step 1112.

Figure 13:
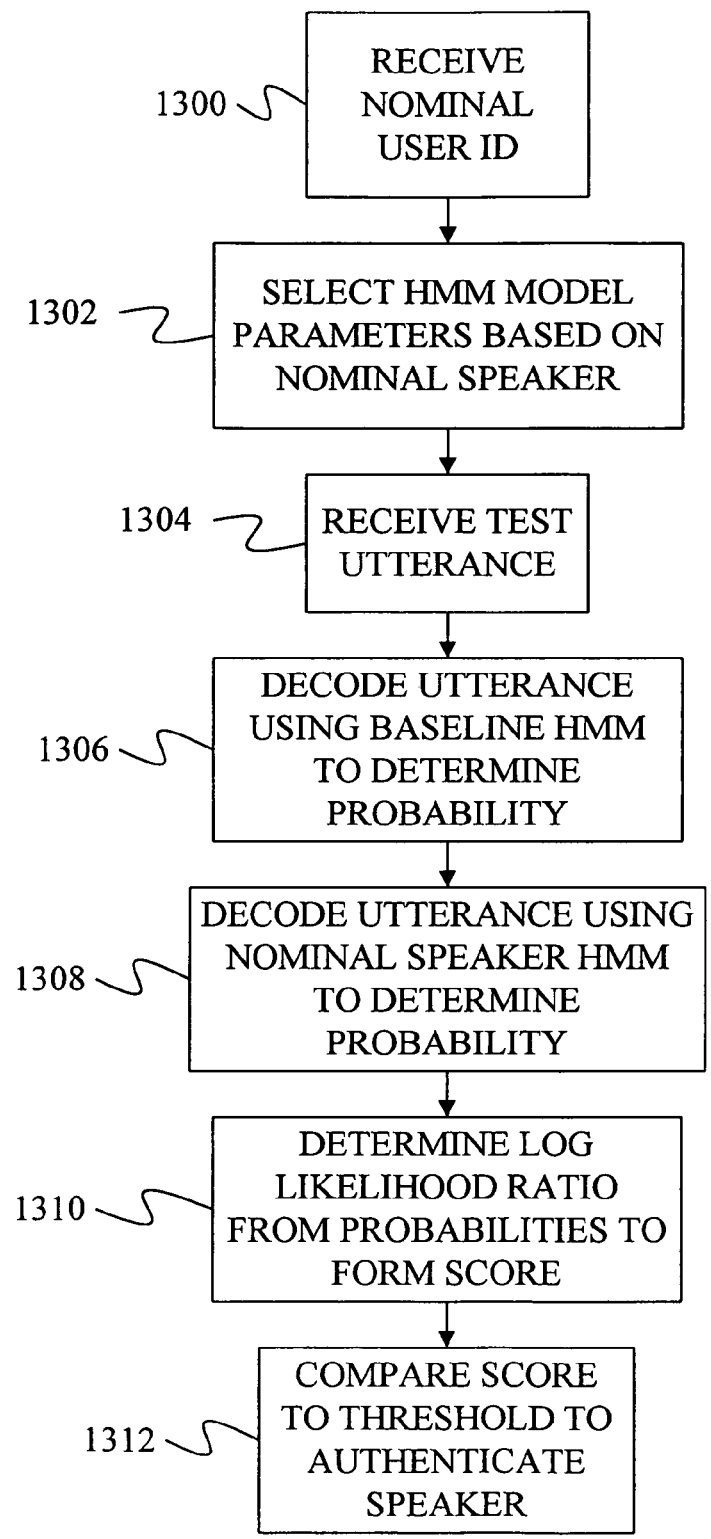
FIG. 13 is a flow diagram of a method of authenticating a test utterance using a Hidden Markov Model.
Figure 14:
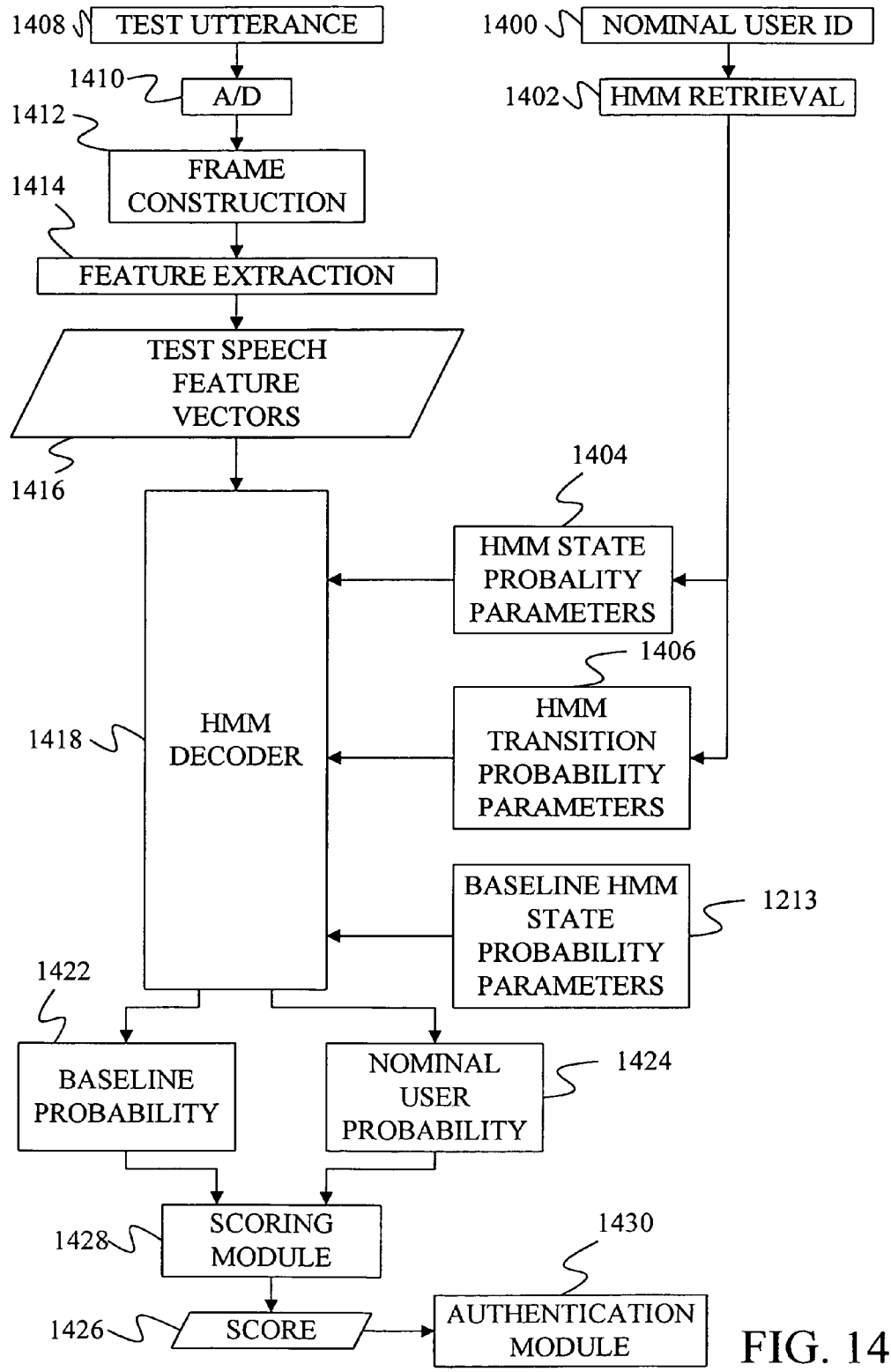
FIG. 14 is a block diagram of elements used to authenticate a test utterance using a Hidden Markov Model.

Once the Hidden Markov Model has been trained, it can be used to perform speaker authentication as shown in the flow diagram of FIG. 13 and the block diagram of FIG. 14. At step 1300, of FIG. 13, a nominal user identification 1400 is received and is used by an HMM retrieval unit 1402 to select Hidden Markov Model state probability parameters 1404 and Hidden Markov Model transition probability parameters 1406 at step 1302.

At step 1304, a test utterance 1408 is received. The test utterance is converted into a sequence of digital values by an analog-to-digital converter 1410 and the sequence of digital values are grouped into frames by a frame construction unit 1412. For each frame, a feature extractor 1414 extracts a feature vector forming a sequence of feature vectors 1416.

At step 1306 test utterance feature vectors 1416 are applied to a Hidden Markov Model decoder 1418, which decodes the feature vectors using a baseline Hidden Markov Model consisting of baseline Hidden Markov Model state probability parameters 1213 generated from the universal background model 1420 and HMM transition probability parameters 1406, which were trained using the method of FIG. 11. HMM decoder 1418 produces a baseline probability 1422 for the most probable state sequence given the baseline HMM state probability parameters 1213 and the HMM transition probability parameters 1406.

At step 1308, HMM decoder 1418 decodes feature vectors 1416 using the Hidden Markov Model state probability parameters 1404 and the HMM transition probability parameters 1406 identified from the nominal user identification. This decoding results in a nominal user probability 1424, which provides a probability for the most probable sequence of HMM states identified given probability parameters 1404 and HMM transition probability parameters 1406.

At step 1310, the ratio of the nominal user probability 1424 and the baseline probability 1422 is applied to a log function by a scoring module 1428 to determine a log likelihood ratio score 1426. At step 1312, this score is compared to a threshold by an authentication module 1430 to determine if the test utterance is from the speaker identified by the nominal user identification.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving a speech signal produced by a user;
   forming adapted means for each of a plurality of mixture components by adapting a background model comprising background means for each of the plurality of mixture components based on the received speech signal;
   receiving a nominal user identification;
   determining a similarity score between the received speech signal and a training speech signal provided by the nominal user by determining the sum of functions determined for the plurality of mixture components, wherein each function comprises the product of a posterior probability of a mixture component based on the received speech signal and a difference between an adapted mean and a background mean; and
   using the similarity score to determine if the received speech signal was produced by the nominal user.

2. The method of claim 1 further comprising forming training means for each of the plurality of mixture components by adapting the background model based on a training speech signal from a user.

3. The method of claim 2 wherein each function further comprises the product of a posterior probability of a mixture component based on the training speech signal and a difference between a training mean and a background mean.

4. The method of claim 3 further comprising selecting training means for use in the functions based on the nominal user identification.

5. The method of claim 1 further comprising forming speaker pool means for each of a plurality of speakers in a speaker pool, the speaker pool means for a speaker being formed by adapting the background model based on speech from the speaker.

6. The method of claim 5 wherein each function further comprises a corresponding threshold value wherein each threshold value is based on speaker pool means for a subset of the speakers in the speaker pool.

7. The method of claim 6 further comprising selecting the subset of speakers from the speaker pool based on a similarity score determined from the speaker pool means and the adapted means.

8. The method of claim 7 further comprising:
   forming training means for each of the plurality of mixture components by adapting the background model based on a training speech signal from a user; and
   determining nominal user thresholds based on speaker pool means for a second subset of the speakers in the speaker pool, the second subset being selected from the speaker pool based on a similarity score determined from the speaker pool means and the training means.

9. The method of claim 8 wherein each function further comprises a second threshold.

10. A computer-readable storage medium having stored thereon computer-executable instructions that when executed by a processor cause the processor to perform steps comprising:
    adapting a background model comprising a background mean based on a test utterance to form a first adapted mean;
    adapting the background model based on a stored user utterance to form a second adapted mean;
    determining a similarity score between the test utterance and each of a set of training utterances based on the first adapted mean to form a first set of similarity scores;
    using the first set of similarity scores to select a subset of the set of training utterances as cohorts for the test utterance;
    determining a similarity score between the stored user utterance and each of the set of training utterances based on the second adapted mean to form a second set of similarity scores;
    using the second set of similarity scores to select a subset of the set of training utterances as cohorts for the stored user utterance;
    using means of the cohorts for the test utterance to calculate a first threshold;
    using means of the cohorts for the stored user utterance to calculate a second threshold;
    using the first threshold, the second threshold, a difference between the first adapted mean and the background mean and a difference between the second adapted mean and the background mean in a calculation of an authentication similarity score between the test utterance and the stored user utterance; and
    using the authentication similarity score to determine whether a same user produced the test utterance and the stored user utterance.

11. The computer-readable storage medium of claim 10 wherein determining a similarity score between the test utterance and a training utterance comprises determining the difference between the first adapted mean and the background mean of the background model and using the difference to determine the similarity score.

12. The computer-readable storage medium of claim 11 wherein determining the similarity score between the test utterance and the training utterance further comprises determining a probability for a mixture component based on the test utterance and using the product of the probability for the mixture component and the difference between the adapted mean and the background mean to determine the similarity score.

* * * * *